US009469099B2

(12) United States Patent
Yoneyama et al.

(10) Patent No.: US 9,469,099 B2
(45) Date of Patent: Oct. 18, 2016

(54) RECORDING APPARATUS AND RECORDING METHOD

(71) Applicant: FUJI XEROX CO., LTD., Tokyo (JP)

(72) Inventors: Hirohito Yoneyama, Kanagawa (JP); Hiroyuki Ueki, Kanagawa (JP); Mami Hatanaka, Kanagawa (JP); Reika Yomogida, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 6 days.

(21) Appl. No.: 14/608,236

(22) Filed: Jan. 29, 2015

(65) Prior Publication Data

US 2016/0023456 A1 Jan. 28, 2016

(30) Foreign Application Priority Data

Jul. 25, 2014 (JP) ................................ 2014-152054

(51) Int. Cl.

| | |
|---|---|
| ***B41J 2/01*** | (2006.01) |
| ***B41M 5/00*** | (2006.01) |
| ***B41M 5/50*** | (2006.01) |
| ***C09D 11/30*** | (2014.01) |
| ***C09D 11/54*** | (2014.01) |

(52) U.S. Cl.

CPC ............... *B41J 2/01* (2013.01); *B41M 5/0023* (2013.01); *C09D 11/30* (2013.01); *B41M 5/50* (2013.01); *C09D 11/54* (2013.01)

(58) Field of Classification Search

None

See application file for complete search history.

(56) References Cited

U.S. PATENT DOCUMENTS

| | | | | |
|---|---|---|---|---|
| 2004/0069183 | A1* | 4/2004 | Kamoto | C09D 11/40 106/31.27 |
| 2011/0059273 | A1* | 3/2011 | Nakano | B41M 5/52 428/32.28 |
| 2013/0149505 | A1* | 6/2013 | Yano | C09D 7/1241 428/195.1 |
| 2013/0155144 | A1* | 6/2013 | Kunimine | B41J 2/07 347/20 |
| 2013/0258011 | A1* | 10/2013 | Boris | C09D 11/38 347/100 |
| 2014/0364548 | A1* | 12/2014 | Everhardus | C09D 11/322 524/166 |

FOREIGN PATENT DOCUMENTS

| | | |
|---|---|---|
| JP | 2006-281533 | 10/2006 |
| JP | 2006-281568 | 10/2006 |

(Continued)

OTHER PUBLICATIONS

Abstract and machine translation of JP 2006-281533.
Abstract and machine translation of JP 2006-281568.

(Continued)

*Primary Examiner* — An Do
*Assistant Examiner* — Renee I Wilson
(74) *Attorney, Agent, or Firm* — Fildes & Outland, P.C.

(57) ABSTRACT

There is provided a recording apparatus equipped with an ejection head that ejects an ink to a surface of the undercoat layer of an impermeable recording medium that has, on at least one surface thereof, an undercoat layer containing a polymeric compound selected from the group consisting of polyurethane, polyester, polyvinyl chloride, and polyolefin, wherein the ink contains a coloring agent, a polymer particle, water, and a water-soluble organic solvent and has a static surface tension of less than 30 mN/m and, when examined for dynamic surface tension by a maximum bubble pressure method, has a width of variation in dynamic surface tension for the period from 1 msec after to 1 sec after of from 0.2 mN/m to 3.0 mN/m.

8 Claims, 1 Drawing Sheet

(56) References Cited

FOREIGN PATENT DOCUMENTS

| | | |
|---|---|---|
| JP | 2006-281570 | 10/2006 |
| JP | 2013-203777 | 10/2013 |
| JP | 2013-245331 | 12/2013 |
| JP | 2014-1378 | 1/2014 |
| JP | 2014-5448 | 1/2014 |

OTHER PUBLICATIONS

Abstract and machine translation of JP 2006-281570.
Abstract and machine translation of JP 2013-203777.
Abstract and machine translation of JP 2013-245331.
Abstract and machine translation of JP 2014-1378.
Abstract and machine translation of JP 2014-5448.

* cited by examiner

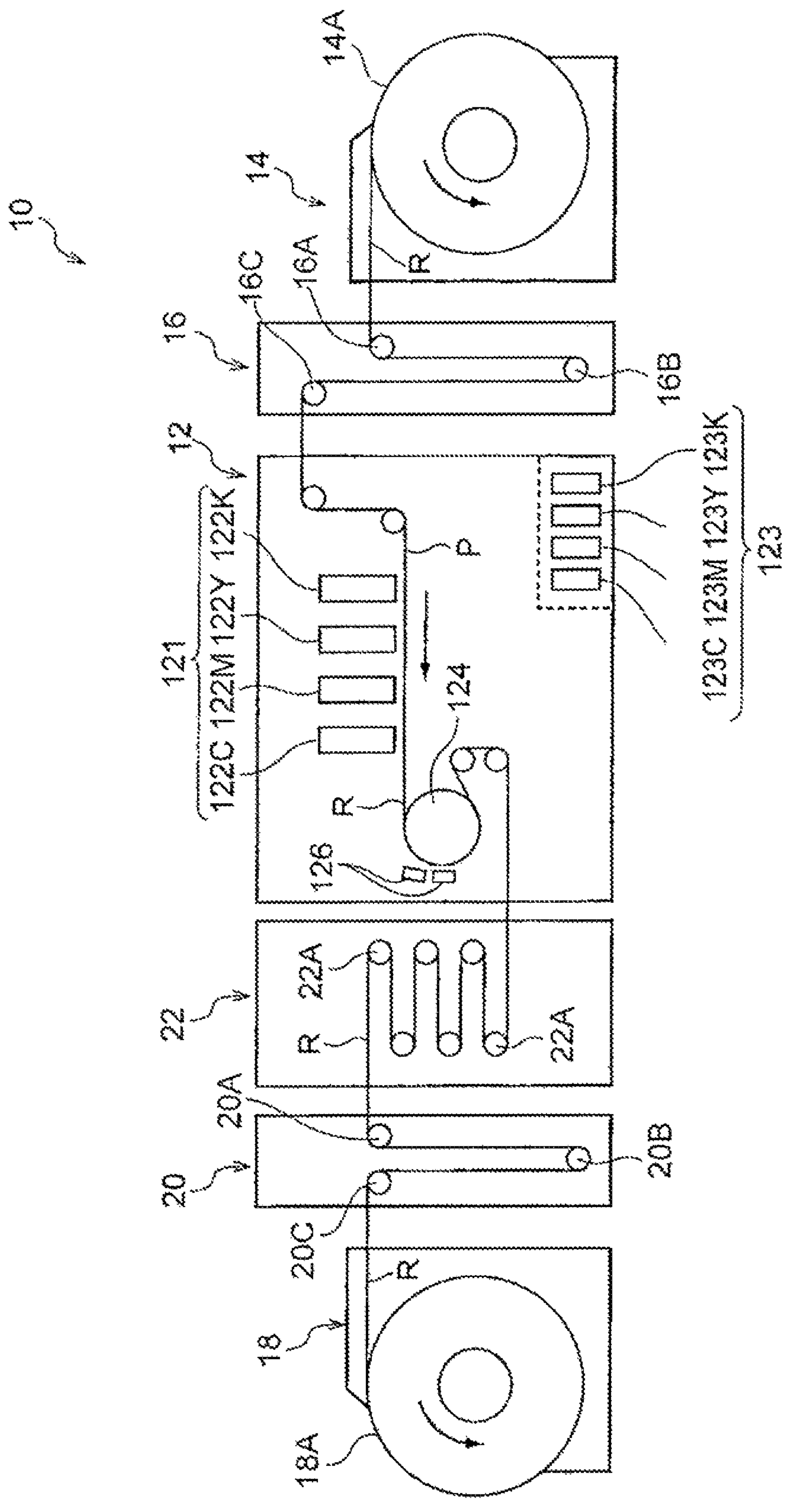
10
14A
14
R
16C
16A
16
16B
12
122K
122Y
122M
122C
121
P
124
R
126
123K
123Y
123M
123C
123
22A
22
R
22A
20A
20
20B
20C
R
18
18A

RECORDING APPARATUS AND RECORDING METHOD

CROSS-REFERENCE TO RELATED APPLICATIONS

This application is based on and claims priority under 35 USC 119 from Japanese Patent Application No. 2014-152054 filed on Jul. 25, 2014.

BACKGROUND

1. Field

The present invention relates to a recording apparatus and a recording method.

2. Description of the Related Art

For the case where recording with an aqueous ink is conducted by ink-jet recording on a recording medium that is an impermeable one such as a plastic film, a technique is, for example, known in which an undercoat layer is formed on the recording surface of the film.

As undercoating fluids for forming such an undercoat layer, the following have, for example, been disclosed. JP-A-2006-281533 (the term "JP-A" as used herein means an "unexamined published Japanese patent application") discloses "an undercoating fluid which at least includes a cyclic amide compound having a specific structure and a main solvent", and JP-A-2006-281568 discloses "an undercoating fluid which at least includes a cyclic ester compound having a specific structure, a thermoplastic resin, and a main solvent". Furthermore, JP-A-2006-281570 discloses "an undercoating fluid which at least includes a cyclic amide compound having a specific structure, a thermoplastic resin, and a main solvent".

Known as aqueous inks for use in printing on plastic films are so-called two-pack type inks such as those shown below.

For example, JP-A-2013-245331 discloses "an aqueous ink set for ink-jet recording with at least two inks, the ink set being characterized by including a first ink that includes a colorant, a resin having hydroxy groups and/or carboxyl groups, and a water-soluble solvent and/or water and a second ink that includes a diallyl-amine-based polymer and a water-soluble solvent and/or water".

JP-A-2014-001378 discloses "an aqueous ink set for ink-jet recording with at least two inks, the ink set being characterized by including a first ink that includes a colorant, a resin having hydroxy groups and/or carboxyl groups, and a water-soluble solvent and/or water and a second ink that includes a cationic polyurethane resin (A) containing a specific structural unit and a water-soluble solvent and/or water".

JP-A-2014-005448 discloses "an aqueous ink set for ink-jet recording with at least two inks, the ink set being characterized by including a first ink that includes a colorant, a resin having hydroxy groups and/or carboxyl groups, and a water-soluble solvent and/or water and a second ink that includes a vinylamine-based polymer and a water-soluble solvent and/or water".

JP-A-2013-203777 discloses "an aqueous ink set for ink-jet recording with at least two inks, the ink set being characterized by including a first ink that includes a colorant, a resin having hydroxy groups and/or carboxyl groups, and a water-soluble solvent and/or water and a second ink that includes a multivalent-metal salt of an organic acid having a $pKa_1$ of 5 or less and having a lactone structure and further includes a water-soluble solvent and/or water".

SUMMARY

[1] A recording apparatus equipped with an ejection head that ejects an ink to a surface of the undercoat layer of an impermeable recording medium that has, on at least one surface thereof, an undercoat layer containing a polymeric compound selected from the group consisting of polyurethane, polyester, polyvinyl chloride, and polyolefin, wherein the ink contains a coloring agent, a polymer particle, water, and a water-soluble organic solvent and has a static surface tension of less than 30 mN/m and, when examined for dynamic surface tension by a maximum bubble pressure method, has a width of variation in dynamic surface tension for the period from 1 msec after to 1 sec after of from 0.2 mN/m to 3.0 mN/m.

BRIEF DESCRIPTION OF THE DRAWINGS

FIGURE is a diagrammatic view which shows the configuration of a recording apparatus according to an exemplary embodiment of the invention.

In FIGURE, 10 denotes Recording apparatus, 12 denotes Image-recording unit, 14 denotes Pretreatment unit, 14A denotes Feed roll, 16 denotes Buffer unit, 16A denotes First path roller, 16B denotes Dancer roller, 16C denotes Second path roller, 18 denotes Post-treatment unit, 20 denotes Buffer unit, 20A denotes First path roller, 20B denotes Dancer roller, 20C denotes Second path roller, 22 denotes Cooling unit, 22A denotes Cooling roller, 121 denotes Ejection device, 122, 122K, 122Y, 122M, 122C denote Ejection head, 123, 123K, 123Y, 123M, 123C denote ink cartridge, 124 denotes Drying drum, 126 denotes Hot-air blower, P denotes Recording medium, R denotes Conveying passage.

DETAILED DESCRIPTION

The recording apparatus and recording method of the invention are explained below in detail on the basis of exemplary embodiments thereof.

The recording apparatus of the exemplary embodiment of the invention is a recording apparatus equipped with an ejection head that ejects an ink to a surface of the undercoat layer of an impermeable recording medium that has, on at least one surface thereof, an undercoat layer including a polymeric compound selected from the group consisting of polyurethane, polyester, polyvinyl chloride, and polyolefin, wherein the ink includes a coloring agent, a polymer particle, water, and a water-soluble organic solvent and has a static surface tension of less than 30 mN/m and, when examined for dynamic surface tension by a maximum bubble pressure method, has a width of variation in dynamic surface tension for the period from 1 msec after to 1 sec after of from 0.2 mN/m to 3.0 mN/m.

In this specification, the ink to be used in the recording apparatus of the exemplary embodiment of the invention and the impermeable recording medium having the undercoat layer to be used in the apparatus are often referred to as "specific ink" and "impermeable medium", respectively.

In the recording apparatus of the exemplary embodiment of the invention, the undercoat layer in the impermeable medium may be formed anytime so long as the undercoat layer is present on the impermeable recording medium at the time when the specific ink is ejected by the ejection head. Specifically, in the recording apparatus of the exemplary embodiment of the invention, an impermeable medium wherein on an impermeable recording medium the undercoat layer is formed beforehand may be used. Alternatively, the undercoat layer may be formed on an impermeable recording medium using a coating device or the like upstream within the recording apparatus of the invention from the ejection head along the impermeable-medium conveying direction.

Known as the recording medium, which is the object to which an ink is ejected, are impermeable recording media into which inks are less apt to permeate, such as plastic films and the so-called coated paper obtained by forming a coating layer on one or each surface of a base.

Meanwhile, examples of inks to be ejected to the surface of such an impermeable recording medium include solvent-based inks, UV-curable inks, two-pack type curable inks, and aqueous inks. There are cases where use of an aqueous ink is desired from the standpoint that aqueous inks have no odor of solvent and are friendly to the environment.

However, there are cases where conventional aqueous inks, when used to record images on an impermeable recording medium, give images which have insufficient abrasion resistance because of the poor adhesion thereof to the recording medium and because of the low drying speed.

The recording apparatus of the exemplary embodiment of the invention is an apparatus wherein recording on an impermeable medium is conducted using the specific ink.

The specific ink is an aqueous ink which contains a polymer particle and in which the static surface tension and the width of variation in dynamic surface tension are within the ranges shown above.

The specific ink, which has a static surface tension within the range shown above and a width of variation in dynamic surface tension that is within the range shown above, is an ink which is reduced in static surface tension and further reduced in the width of variation in dynamic surface tension. The specific ink is an ink that has the property of spreading on and wetting the surface of the recording medium to which the ink is ejected.

Since the specific ink, which has the property of spreading on and wetting surfaces, spreads on and wets the surface of the recording medium, the ink becomes easy to dry and comes to have increased viscosity, resulting in an improvement in drying efficiency. In addition, it is thought that the polymer particles in the specific ink have an adhesive function to improve adhesion between the specific ink and the recording medium.

Meanwhile, the undercoat layer of the impermeable medium is a layer which includes a specific polymeric compound selected from the choices shown above. It is thought that the polymeric compound in the undercoat layer has adhesiveness to the impermeable medium or to the ink and, hence, an improvement in adhesiveness between the undercoat layer and the specific ink ejected thereto is attained.

Consequently, according to the recording apparatus of the exemplary embodiment of the invention, since excellent adhesiveness between the specific ink and the impermeable medium is attained, images having excellent adhesion to the impermeable medium (or to the undercoat layer thereof) can be formed. As a result, the images formed are inhibited from peeling off upon sliding or rubbing and have excellent abrasion resistance.

[Recording Apparatus/Recording Method]

The recording apparatus of the exemplary embodiment of the invention is explained below together with the recording method of the exemplary embodiment of the invention.

As stated above, the recording apparatus of the exemplary embodiment of the invention is a recording apparatus equipped with an ejection head which ejects the specific ink to the surface of the undercoat layer of an impermeable medium. According to the recording apparatus of the exemplary embodiment of the invention, a recording method that includes an ejection step in which the specific ink is ejected to the surface of the undercoat layer of an impermeable medium is rendered possible.

The recording apparatus of the exemplary embodiment of the invention may be further equipped with a drying device for drying the ink ejected to the surface of the undercoat layer of the impermeable medium. This recording apparatus further equipped with the drying device enables the recording method to further include a drying step in which the ink ejected to the surface of the undercoat layer of the impermeable medium is dried.

The ink ejected to the surface of the undercoat layer of the impermeable medium is dried by the drying device (in the drying step), thereby rendering high-speed recording possible.

An example of the recording apparatus of the exemplary embodiment of the invention is explained below by reference to the drawing.

FIGURE is a diagrammatic view which shows the configuration of a recording apparatus according to the exemplary embodiment.

The recording apparatus 10 according to the exemplary embodiment is equipped with ejection heads 122 (or with an ejection device 121 having ejection heads 122) which each eject a specific ink to the surface of the undercoat layer of an impermeable medium P.

With the recording apparatus 10 according to the exemplary embodiment, a recording method including an ejection step for ejecting specific inks to the surface of the undercoat layer of an impermeable medium P is rendered possible. Thus, an image formed from the specific inks is recorded on the undercoat layer of the impermeable medium P.

More specifically, the recording apparatus 10 according to the exemplary embodiment is equipped with an image-recording unit 12 in which an image is recorded on the undercoat layer of an impermeable medium P.

The recording apparatus 10 is equipped with a pretreatment unit 14 in which the impermeable medium P to be supplied to the image-recording unit 12 is retained and with a buffer unit 16 which regulates the conveying rate, etc. of the impermeable medium P being supplied from the pretreatment unit 14 to the image-recording unit 12. The buffer unit 16 is disposed between the image-recording unit 12 and the pretreatment unit 14.

The recording apparatus 10 is equipped, for example, with a post-treatment unit 18 for retaining therein the impermeable medium P discharged from the image-recording unit 12 and with a buffer unit 20 which regulates the conveying rate, etc. of the impermeable medium P discharged from the image-recording unit 12 to the post-treatment unit 18. The buffer unit 20 is disposed between the image-recording unit 12 and the post-treatment unit 18.

The recording apparatus 10 is equipped with a cooling unit 22 which is disposed between the image-recording unit 12 and the buffer unit 20 and which cools the impermeable medium P conveyed out from the image-recording unit 12.

The image-recording unit 12 is equipped, for example, with roll members (reference numerals are omitted) which guide the impermeable medium P along a conveying passage R of the impermeable medium P and with an ejection device 121 which ejects specific inks (droplets of specific inks) to the impermeable medium P being conveyed along the conveying passage R of the impermeable medium P and which thereby records an image.

The ejection device 121 is equipped with ejection heads 122 which eject specific inks to the impermeable medium P. The ejection heads 122 are each, for example, a long recording head which has an effective recording area (area over which nozzles for ejecting a specific ink are disposed) not shorter than the width of the impermeable medium P (i.e., the dimension thereof along a direction that crosses (for example, is perpendicular to) the conveying direction of the impermeable medium P).

The ejection heads 122 are not limited to the type shown above, and may be ejection heads that are shorter than the width of the impermeable medium P and are of the type in which each head ejects a specific ink while traveling in the width direction of the impermeable medium P (so-called carriage type).

The ejection heads 122 may be of the so-called thermal type in which droplets of specific inks are ejected by heat, or may be the so-called piezoelectric type in which droplets of specific inks are ejected by pressure. Known types are applicable.

The ejection heads 122 include, for example, an ejection head 122K which ejects a specific ink to the impermeable medium P to record an image of a K (black) color thereon, an ejection head 122Y which likewise records an image of a Y (yellow) color, an ejection head 122M which likewise records an image of an M (magenta) color, and an ejection head 122C which likewise records an image of a C (cyan) color. The ejection head 122K, ejection head 122Y, ejection head 122M, and ejection head 122C are arranged in this order from the upstream side to the downstream side along the conveying direction of the impermeable medium P (hereinafter often referred to simply as "paper conveying direction") so that these ejection heads face the impermeable medium P. Incidentally, in the case where the ejection heads for K, Y, M, and C are inclusively referred to, the affixed symbols K, Y, M, and C are omitted.

The ejection heads 122K, 122Y, 122M, and 122C are connected respectively to ink cartridges 123K, 123Y, 123M, and 123C of respective colors through feed tubes (not shown), the ink cartridges being mounted on and demounted from the recording apparatus 10. From the ink cartridges 123, the inks of respective colors are supplied to the respective ejection heads 122.

The inks retained in the ink cartridges 123K, 123Y, 123M, and 123C of respective colors are not particularly limited so long as at least one of these is the specific ink described above. It is, however, preferable that all these inks are specific inks.

The ejection heads 122 are not limited to the mode in which four ejection heads 122 respectively corresponding to the four colors are disposed. A mode in which more than four ejection heads 122 respectively corresponding to more than four colors including one or more intermediate colors in addition to the four colors are disposed may be used, according to purposes.

The ejection heads 122 may include, for example, either an ejection head 122 for low resolution which ejects a specific ink so that the amount of each ink droplet is in the range of from 1 pL to 15 pL (e.g., an ejection head for 600 dpi) or an ejection head 122 for high resolution which ejects a specific ink so that the amount of each ink droplet is below 10 pL (e.g., an ejection head for 1,200 dpi). The ejection device 121 may be equipped with both the ejection head 122 for low resolution and the ejection head 122 for high resolution. The ink droplet amount for an ejection head 122 is given in terms of the range of the amount of the largest droplet of the specific ink. Furthermore, "dpi" means "dot per inch".

The image-recording unit 12 includes a drying drum 124 (an example of the drying device) disposed downstream from the ejection heads 122 along the paper conveying direction. For example, the drying drum 124 is configured so that the back surface of the impermeable medium P is wound and stretched on the drying drum 124 and the drying drum 124 dries the image (inks) formed on the undercoat layer, while being rotated by the contact with the impermeable medium P.

A heating element (e.g., a halogen lamp heater, not shown) is built into the drying drum 124. The drying drum 124 dries the image (inks) formed on the undercoat layer of the impermeable medium P, by means of the heating by the heating element.

At the periphery of the drying drum 124, a hot-air blower 126 (an example of the drying device) for drying the image (inks) formed on the undercoat layer of the impermeable medium P is disposed. The image (inks) formed on the undercoat layer of the impermeable medium P wound and stretched on the drying drum 124 is dried with the hot air supplied from the hot-air blower 126.

In the case of using a drying device for conducting such thermal drying, the drying conditions are preferably as follows.

For example, the temperature of the heating element of the drying drum and the temperature of the hot air supplied from the hot-air blower are preferably in the range of from 40° C. to 120° C., more preferably in the range of from 60° C. to 100° C., from the standpoints of accelerating the drying of the inks, inhibiting the impermeable medium P from deforming, and inhibiting the undercoat layer from deteriorating.

In the image-recording unit 12, another drying device for drying the image (inks) formed on the undercoat layer of the impermeable medium P, such as a near-infrared heater (not shown) or a laser irradiator, may be disposed downstream from the ejection heads 122 along the paper conveying direction. Such another drying device, e.g., near-infrared heater or a laser irradiator, is disposed in place of the drying drum 124 and/or the hot-air blower 126 or in addition to the drying drum 124 and the hot-air blower 126.

Meanwhile, the pretreatment unit 14 is equipped with a feed roll 14A on which the impermeable medium P to be supplied to the image-recording unit 12 is wound. This feed roll 14A is rotatably supported on a frame member (not shown).

The buffer unit 16 includes, for example, a first path roller 16A, a dancer roller 16B, and a second path roller 16C which are disposed along the paper conveying direction. The dancer roller 16B moves vertically in FIGURE to thereby regulate the tension of the impermeable medium P being conveyed to the image-recording unit 12 and further regulate the rate of conveying the impermeable medium P.

The post-treatment unit 18 is equipped with a wind-up roll 18A as an example of conveying parts for winding up the impermeable medium P on which an image is recorded. This wind-up roll 18A rotates upon reception of rotating force from a motor (not shown), and the impermeable medium P is thereby conveyed along the conveying passage R.

The buffer unit 20 includes, for example, a first path roller 20A, a dancer roller 20B, and a second path roller 20C which are disposed along the paper conveying direction. The dancer roller 20B moves vertically in FIGURE to thereby regulate the tension of the impermeable medium P being discharged to the post-treatment unit 18 and further regulate the rate of conveying the impermeable medium P.

In the cooling unit 22, a plurality of cooling rollers 22A are disposed. The impermeable medium P is conveyed through the plurality of cooling rollers 22A, thereby cooling the impermeable medium P.

Next, the operation (recording method) with the recording apparatus 10 according to the exemplary embodiment is explained.

In the recording apparatus 10 according to the exemplary embodiment, an impermeable medium P is first conveyed from the feed roll 14A of the pretreatment unit 14 to the image-recording unit 12 via the buffer unit 16.

Subsequently, in the image-recording unit 12, inks are ejected to the surface of the undercoat layer of the impermeable medium P from the ejection heads 122 of the ejection device 121. Thus, an image constituted of the inks is formed on the undercoat layer of the impermeable medium P. Thereafter, the image (inks) on the undercoat layer of the impermeable medium P is dried with the drying drum 124 from the back-surface side of the impermeable medium P (i.e., the surface on the reverse side from the recording surface). Furthermore, the inks (image) ejected to the surface of the undercoat layer of the impermeable medium P are dried with the hot-air blower 126 from the front-surface side (recording surface) of the impermeable medium P. Namely, the inks ejected to the surface of the undercoat layer of the impermeable medium P are dried with the drying drum 124 and the hot-air blower 126.

Next, in the cooling unit 22, the impermeable medium P on which an image is recorded is cooled with the cooling rollers 22A.

The impermeable medium P on which an image is recorded is then sent via the buffer unit 16 to the post-treatment unit 18, where the impermeable medium P is wound up by the wind-up roll 18A.

Through the steps described above, an image formed from specific inks is recorded on the undercoat layer of the impermeable medium P.

Incidentally, the recording medium P which bears the image recorded in the manner described above is subjected to a cutting step to cut the medium P into a desired size.

The recording apparatus 10 according to this exemplary embodiment shown above is an example in which an impermeable medium having an undercoat layer formed beforehand is used as the recording medium P. However, the recording apparatus of the invention is not limited to that example, and may be the recording apparatus 10 which is equipped inside with a device for forming an undercoat layer.

The device for forming an undercoat layer may be any device which applies the coating fluid for undercoat layer formation that will be described later to a surface of an impermeable recording medium and which dries the applied coating fluid to form an undercoat layer. The device may be one obtained by combining a known coating device with a known drying device according to need.

The recording apparatus 10 according to the exemplary embodiment explained above is of the type in which ink droplets are ejected directly to a surface of an impermeable medium P by the ejection device 121 (ejection heads 122). However, the recording apparatus of the invention is not limited thereto, and may be of the type in which ink droplets are ejected, for example, to an intermediate transfer member and the ink droplets on the intermediate transfer member are thereafter transferred to an impermeable medium P.

Furthermore, the recording apparatus 10 according to the exemplary embodiment explained above is of the type in which inks are ejected to a roll-shaped impermeable medium P to record an image. However, the recording apparatus of the invention may be of the type in which inks are ejected to, for example, sheets of paper having a desired size to record an image thereon.

[Specific Ink]

Next, the specific ink is explained.

The specific ink includes a coloring agent, a polymer particle, water, and a water-soluble organic solvent, has a static surface tension less than 30 mN/m, and when examined for dynamic surface tension by a maximum bubble pressure method, has a width of variation in dynamic surface tension for the period from 1 msec after to 1 sec after (hereinafter also referred to simply as "width of variation in dynamic surface tension") of from 0.2 mN/m to 3.0 mN/m.

The static surface tension of the specific ink is less than 30 mN/m, and is preferably from 22 mN/m to 28 mN/m from the standpoint of ejection stability.

The values of static surface tension herein are ones measured in an atmosphere of 23° C. and 55% RH using Wilhelmy surface tensiometer CBVP-Z (manufactured by Kyowa Interface Science Co., Ltd.).

The width of variation in dynamic surface tension of the specific ink is from 0.2 mN/m to 3.0 mN/m. From the standpoint of inhibiting image blurring and image peeling, the width of variation thereof is preferably from 0.2 mN/m to 2.0 mN/m, more preferably from 0.2 mN/m to 1.0 mN/m.

Incidentally, the width of variation in dynamic surface tension is the difference between the value of dynamic surface tension measured at 1 msec after and the value of dynamic surface tension measured at 1 sec after.

From the standpoint of inhibiting image blurring and image peeling, the dynamic surface tension of the specific ink as measured at 1 msec after is preferably 33 mN/m or less, more preferably from 20 mN/m to 30 mN/m, even more preferably from 22 mN/m to 28 mN/m.

Meanwhile, the dynamic surface tension of the specific ink as measured at 1 sec after is preferably 30 mN/m or less, more preferably from 20 mN/m to 30 mN/m, even more preferably from 22 mN/m to 28 mN/m, from the standpoint of dryability.

The values of dynamic surface tension are ones measured in an atmosphere of 23° C. and 55% RH using dynamic surface tensiometer MPT-C (manufactured by LAUDA GmbH), which is based on the maximum bubble pressure method.

Incidentally, the value of dynamic surface tension as measured at 1 msec after is the value of dynamic surface tension measured at the time when 1 msec has passed since a new interface was formed at the end of the capillary and when a maximum bubble pressure is reached. It is, however, noted that in dynamic surface tensiometers based on the maximum bubble pressure method in which a limit of measurement is a dynamic surface tension measured at 1 msec after, there are cases where this value is expressed as dynamic surface tension measured at 0 msec after. In this case, the value of dynamic surface tension measured at 0 msec after is taken as a value of dynamic surface tension measured at 1 msec after.

Meanwhile, the value of dynamic surface tension as measured at 1 sec after is the value of dynamic surface tension measured at the time when 1 sec has passed since a new interface was formed at the end of the capillary and when a maximum bubble pressure is reached. It is, however, noted that in dynamic surface tensiometers based on the maximum bubble pressure method in which a limit of measurement is a dynamic surface tension measured at less than 1 sec after, the value of dynamic surface tension measured at the limit of measurement is taken as a value of dynamic surface tension measured at 1 sec after. This is because so long as the value of dynamic surface tension is one measured at the limit of measurement, it is possible to determine that the dynamic surface tension was in a stable region.

From the standpoint of regulating the specific ink so that the static surface tension, the width of variation in dynamic surface tension, and the dynamic surface tension as measured at 1 msec after or at 1 sec after are within the ranges shown above, it is desirable, for example, that the ink should contain a surfactant in addition to a coloring agent, a polymer particle, water, and a water-soluble organic solvent. Namely, it is desirable that the static surface tension, the width of variation in dynamic surface tension, and the dynamic surface tension as measured at 1 msec after or at 1 sec after should be regulated by changing the kind of surfactant and the amount thereof.

Examples of the surfactant include surfactants having an HLB (hydrophile-lipophile balance) of 14 or less. For example, by regulating the amount of a surfactant having an HLB of 14 or less, the ink is rendered easy to regulate so as to have a desired static surface tension. Furthermore, in cases when use is made of a plurality of surfactants which each have an HLB of 14 or less but which differ in HLB, it is easy to regulate the ink so as to have a desired dynamic surface tension. Specifically, in cases when, for example, a surfactant having an HLB of from 9 to 14 and a surfactant having an HLB of from 4 to 8 are used, it is easy to regulate the ink so as to have a desired dynamic surface tension.

Incidentally, HLB (hydrophile-lipophile balance) is defined by the following equation (Griffin method).

HLB=20×[(total formula weight of the hydrophilic moieties)/(molecular weight)]

Examples of such surfactants include at least one member selected from the group consisting of ethylene oxide adducts of acetylene glycol and polyether-modified silicones.

The ethylene oxide adducts of acetylene glycol are, for example, compounds obtained by causing ethylene oxide to add to at least one of the hydroxyl groups of acetylene glycol and having the structure $—O—(CH_2CH_2O)_n—H$ (n represents an integer of, for example, 1-30).

Examples of commercial products of the ethylene oxide adducts of acetylene glycol (the numerals within the parentheses are HLB values given in the catalogs) include Olfin E1004 (7-9), Olfin E1010 (13-14), Olfin EXP. 4001 (8-11), Olfin EXP. 4123 (11-14), Olfin EXP. 4300 (10-13), Surfynol 104H (4), Surfynol 420 (4), Surfynol 440 (4), and Dynol 604 (8) [all manufactured by Nissin Chemical Industry Co., Ltd.].

The content of such an ethylene oxide adduct of acetylene glycol is, for example, desirably from 0.01% by mass to 10% by mass, preferably from 0.1% by mass to 5% by mass, based on the specific ink.

The polyether-modified silicones are, for example, compounds formed by bonding a polyether group, as a grafted pendant chain or as a block, to a silicone chain (polysiloxane backbone). Examples of the polyether group include a polyoxyethylene group and a polyoxypropylene group. The polyether group may be, for example, a polyoxyalkylene group composed of oxyethylene groups and oxypropylene groups which have combined together by block or random addition.

Examples of commercial products of the polyether-modified silicones (the numerals within the parentheses are HLB values given in the catalogs) include Silface SAG002 (12), Silface SAG503A (11), and Silface SAG005 (7) [all manufactured by Nissin Chemical Industry Co., Ltd.].

The content of such a polyether-modified silicone is, for example, desirably from 0.01% by mass to 5% by mass, preferably from 0.05% by mass to 1% by mass, based on the specific ink.

Next, the composition and properties of the specific ink are explained in detail.

The specific ink includes a coloring agent, polymer particles, water, and a water-soluble organic solvent.

(Coloring Agent)

First, the coloring agent is explained.

The coloring agent to be used may be one which is suitable for the specific ink having a desired hue, and examples thereof include pigments. Examples of the pigments include organic pigments and inorganic pigments.

Specific examples of black pigments include: Raven 7000, Raven 5750, Raven 5250, Raven 5000 ULTRAII, Raven 3500, Raven 2000, Raven 1500, Raven 1250, Raven 1200, Raven 1190 ULTRAII, Raven 1170, Raven 1255, Raven 1080, and Raven 1060 (all manufactured by Columbian Carbon Ltd.); Regal 400R, Regal 330R, Regal 660R, Mogul L, Black Pearls L, Monarch 700, Monarch 800, Monarch 880, Monarch 900, Monarch 1000, Monarch 1100, Monarch 1300, and Monarch 1400 (all manufactured by Cabot Corp.); Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (all manufactured by Degussa AG); and No. 25, No. 33, No. 40, No. 47, No. 52, No. 900, No. 2300, MCF-88, MA600, MA7, MA8, and MA100 (all manufactured by Mitsubishi Chemical Corp.). However, usable black pigments are not limited to these examples.

Specific examples of cyan pigments include C.I. Pigment Blues 1, 2, 3, 15, 15:1, 15:2, 15:3, 15:4, 16, 22, and 60. However, usable cyan pigments are not limited to these examples.

Specific examples of magenta pigments include C.I. Pigment Reds 5, 7, 12, 48, 48:1, 57, 112, 122, 123, 146, 168, 177, 184, and 202 and C.I Pigment Violet 19. However, usable magenta pigments are not limited to these examples.

Specific examples of yellow pigments include C.I. Pigment Yellows 1, 2, 3, 12, 13, 14, 16, 17, 73, 74, 75, 83, 93, 95, 97, 98, 114, 128, 129, 138, 151, 154, and 180. However, usable yellow pigments are not limited to these examples.

In the case where a pigment is used as the coloring agent, it is preferred to use a pigment dispersant in combination therewith. Examples of the pigment dispersant to be used include polymeric dispersants, anionic surfactants, cationic surfactants, amphoteric surfactants, and nonionic surfactants.

A suitable polymeric dispersant is a polymer which has a hydrophilic structure part and a hydrophobic structure part. As the polymer having a hydrophilic structure part and a hydrophobic structure part, use may be made of, for example, a condensation polymer and an addition polymer. Examples of the condensation polymer include known polyester-based dispersants. Examples of the addition polymer include addition polymers of monomers having an α,β-ethylenically unsaturated group. By copolymerizing a monomer which has an α,β-ethylenically unsaturated group having a hydrophilic group with a monomer which has an α,β-ethylenically unsaturated group having a hydrophobic group, a desired polymeric dispersant may be obtained. Use may also be made of a homopolymer of a monomer which has an α,β-ethylenically unsaturated group having a hydrophilic group.

Examples of the monomers having an α,β-ethylenically unsaturated group having a hydrophilic group include monomers having a carboxyl group, sulfo group, hydroxyl group, phosphate group, etc., such as acrylic acid, methacrylic acid, crotonic acid, itaconic acid, itaconic acid monoesters, maleic acid, maleic acid monoesters, fumaric acid, fumaric acid monoesters, vinylsulfonic acid, styrenesulfonic acid, sulfonated vinylnapthalencs, vinyl alcohol, acrylamide, methacryloxyethyl phosphate, bismethacryloxyethyl phosphate, methacryloxyethyl phenyl acid phosphate, ethylene glycol dimethacrylate, and diethylene glycol dimethacrylate.

Examples of the monomers having an α,β-ethylenically unsaturated group having a hydrophobic group include styrene, styrene derivatives such as α-methylstyrene and vinyltoluene, vinylcyclohexane, vinylnaphthalene, vinylnaphthalene derivatives, acrylic acid alkyl esters, methacrylic acid alkyl esters, the phenyl ester of methacrylic acid, methacrylic acid cycloalkyl esters, crotonic acid alkyl esters, itaconic acid dialkyl esters, and maleic acid dialkyl esters.

Examples of the copolymer which is a preferred polymeric dispersant include styrene/styrenesulfonic acid copolymers, styrene/maleic acid copolymers, styrene/methacrylic acid copolymers, styrene/acrylic acid copolymers, vinylnaphthalene/maleic acid copolymers, vinylnaphthalene/methacrylic acid copolymers, vinylnaphthalene/acrylic acid copolymers, alkyl acrylate/acrylic acid copolymers, alkyl methacrylate/methacrylic acid copolymers, styrene/alkyl methacrylate/methacrylic acid copolymers, styrene/alkyl acrylate/acrylic acid copolymers, styrene/phenyl methacrylate/methacrylic acid copolymers, and styrene/cyclohexyl methacrylate/methacrylic acid copolymers. Monomers having a polyoxyethylene group or a hydroxyl group may be copolymerized with these polymers.

It is desirable that the polymeric dispersant should have a weight-average molecular weight of, for example, from 2,000 to 50,000.

Such polymeric dispersants may be used either alone or in combination of two or more thereof. The content of the polymeric dispersant cannot be unconditionally shown since the content thereof varies considerably depending on the pigment. It is, however, desirable that the content thereof should be from 0.1% by mass to 100% by mass based on the pigment.

Examples of the pigments further include pigments which self-disperse in water (hereinafter referred to as self-dispersion type pigments).

The term self-dispersion type pigment means a pigment which has water-soluble groups on the surface thereof and which disperses in water even in the absence of a polymeric dispersant. The self-dispersion type pigment is obtained, for example, by subjecting a pigment to a surface modification treatment such as an acid/base treatment, coupling agent treatment, polymer grafting treatment, plasma treatment, or oxidation/reduction treatment.

Other than the pigment obtained by subjecting a pigment to a surface modification treatment, examples of the self-dispersion type pigments include commercial self-dispersion type pigments such as: Cab-o-jet-200, Cab-o-jet-300, Cab-o-jet-400, IJX-157, IJX-253, IJX-266, IJX-273, IJX-444, JIX-55, Cab-o-jet-250C, Cab-o-jet-260M, Cab-o-jet-270Y, Cab-o-jet-450C, Cab-o-jet-465M, Cab-o-jet-470Y, and Cab-o-jet-480M, all manufactured by Cabot Corp.; and Microjet Black CW-1 and CW-2, manufactured by Orient Chemical Industries, Ltd.

It is preferable that the self-dispersion type pigments should be pigments which have at least a sulfonic acid, sulfonic acid salt, carboxylic acid, or carboxylic acid salt as functional groups on the surfaces thereof. More preferred is a pigment which has at least a carboxylic acid or a carboxylic acid salt as functional groups on the surface thereof.

Examples of the pigments further include pigments coated with a resin. These pigments are called microcapsule pigments, and there are commercial microcapsule pigments manufactured by DIC Corp., Toyo Ink Mfg. Co., Ltd., etc. They are not limited to commercial microcapsule pigments, and a microcapsule pigment produced in accordance with a purpose may be used.

Examples of the pigments furthermore include a resin dispersion type pigment obtained by physically adsorbing or chemically bonding a polymeric compound to a pigment.

Other than black pigments and pigments of the three primary colors of cyan, magenta, and yellow, examples of the pigments include pigments of specific colors of red, green, blue, brown, white, etc., metallic-luster pigments of golden, silver, or other colors, colorless or light-colored extender pigments, and plastic pigments.

Examples of the pigments still further include particles obtained by fixing a dye or a pigment to the surface of silica, alumina, polymer beads, or the like as cores, lake pigments obtained by insolubilizing dyes, colored emulsions, and colored latexes.

Other than pigments, examples of the coloring agents include: dyes such as hydrophilic anionic dyes, direct dyes, cationic dyes, reactive dyes, polymeric dyes, and oil-soluble dyes; wax powders, resin powders, and emulsions colored with dyes; and fluorescent dyes and fluorescent pigments.

The coloring agent may have a volume-average particle diameter of, for example, from 10 nm to 1,000 nm.

The term "volume-average particle diameter of a coloring agent" means the particle diameter of the coloring agent itself or, in the case of a coloring agent to which an additive such as a dispersant is adherent, means the diameter of the particles including the adherent additive.

The volume-average particle diameter is determined using particle size analyzer Microtrac UPA-UTI51 (manufactured by Microtrac Inc.). In the measurement, a specific ink diluted 1,000 times is introduced into the measuring cell and examined. As values to be inputted for the determination, the viscosity of the diluted specific ink is used as the viscosity value and the refractive index of the coloring agent is used as the refractive index of particles.

The content (concentration) of the coloring agent is, for example, preferably from 1% by mass to 25% by mass, more preferably from 2% by mass to 20% by mass, based on the specific ink.

(Polymer Particle)

The polymer particle is explained.

The polymer particle is a component which enhances the fixability of images formed from the specific ink to recording media.

Examples of the polymer particle include a particle (latex particle) of styrene/acrylic acid copolymer, styrene/acrylic acid/sodium acrylate copolymer, styrene/butadiene copolymer, polystyrene, acrylonitrile/butadiene copolymer, acrylic acid ester copolymer, polyurethane, silicone/acrylic acid copolymer, acrylic-modified fluororesin, etc. Examples of the polymer particle further include core/shell type polymer particle in which the central part and peripheral part of each particle differ in composition.

The polymer particle may be one which is dispersed in the specific ink using an emulsifying agent, or may be one which is dispersed in the specific ink without using an emulsifying agent. Examples of the emulsifying agent include a surfactant and a polymer having a hydrophilic group such as a sulfonic acid group or a carboxyl group (e.g., a polymer onto which a hydrophilic group is grafted and a polymer obtained from a monomer having hydrophilicity and a monomer having a hydrophobic portion).

The volume-average particle diameter of the polymer particle is preferably from 10 nm to 300 nm, more preferably from 10 nm to 200 nm, from the standpoints of the glossiness and abrasion resistance of images.

The volume-average particle diameter of the polymer particle is determined using particle size analyzer Microtrac UPA-UTI51 (manufactured by Microtrac Inc.). In the measurement, a specific ink diluted 1,000 times is introduced into the measuring cell and examined. As values to be inputted for the determination, the viscosity of the specific diluted ink is used as the viscosity value and the refractive index of the polymer is used as the refractive index of particle.

The polymer particle has a glass transition temperature of preferably from −20° C. to 80° C., more preferably from −10° C. to 60° C., from the standpoint of the abrasion resistance of images.

The glass transition temperature of polymer particle is determined from a DSC curve obtained by differential scanning calorimetry (DSC). More specifically, the glass transition temperature thereof is determined in accordance with "Extrapolated Glass Transition Initiation Temperature" described under Method for Determining Glass Transition Temperature in JIS K7121-1987 "Method for Determining Transition Temperatures of Plastics".

The content of the polymer particle is, for example, preferably from 0.1% by mass to 10% by mass, more preferably from 0.5% by mass to 5% by mass, based on the specific ink from the standpoint of enhancing image fixability and of ejection stability.

(Water)

The water is explained.

Suitable examples of the water include ion-exchanged water, ultrapure water, distilled water, and water purified by ultrafiltration, especially from the standpoint of preventing inclusion of impurities or proliferation of microorganisms.

The content of water is, for example, preferably from 10% by mass to 95% by mass, more preferably from 30% by mass to 90% by mass, based on the specific ink.

(Water-Soluble Organic Solvent)

The water-soluble organic solvent is explained.

Examples of the water-soluble organic solvent include polyhydric alcohols, derivatives of polyhydric alcohols, nitrogen-containing solvents, alcohols, and sulfur-containing solvents. Other examples of the water-soluble organic solvent include propylene carbonate and ethylene carbonate.

Examples of the polyhydric alcohols include: sugar alcohols such as ethylene glycol, diethylene glycol, propylene glycol, butylene glycol, triethylene glycol, 1,5-pentanediol, 1,2-hexanediol, 1,2,6-hexanetriol, glycerin, trimethylolpropane, and xylitol; and saccharides such as xylose, glucose, and galactose.

Examples of the derivatives of polyhydric alcohols include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and ethylene oxide adducts of diglycerin.

Examples of the nitrogen-containing solvent include pyrrolidone, N-methyl-2-pyrrolidone, cyclohexylpyrrolidone, and triethanolamine.

Examples of the alcohols include ethanol, isopropyl alcohol, butyl alcohol, and benzyl alcohol.

Examples of the sulfur-containing solvent include thiodiethanol, thiodiglycerol, sulfolane, and dimethyl sulfoxide.

Such water-soluble organic solvent may be used either alone or in combination of two or more thereof.

The content of the water-soluble organic solvent is preferably from 1% by mass to 60% by mass, more preferably from 1% by mass to 40% by mass, based on the water.

(Surfactant)

The surfactant is explained.

The specific ink may contain a surfactant other than the ethylene oxide adduct of acetylene glycol and polyether-modified silicone described above. Examples of the other surfactant include anionic surfactants, nonionic surfactants, cationic surfactants, and amphoteric surfactants. Preferred are anionic surfactants and nonionic surfactants.

Examples of the anionic surfactants include alkylbenzenesulfonic acid salts, alklylphenylsulfonic acid salts, alkylnaphthalenesulfonic acid salts, higher fatty acid salts, sulfuric acid ester salts of higher fatty acid esters, sulfonic acid salts of higher fatty acid esters, sulfuric acid ester salts and sulfonic acid salts of higher alcohol ethers, (higher-alkyl) sulfosuccinic acid salts, polyoxyethylene alkyl ether carboxylic acid salts, polyoxyethylene alkyl ether sulfuric acid salts, alkylphosphoric acid salts, and polyoxyethylene alkyl ether phosphoric acid salts.

Preferred of these anionic surfactants are dodecylbenzenesulfonic acid salts, isopropylnaphthalenesulfonic acid salts, monobutylphenylphenolmonosulfonic acid salts, monobutylbiphenylsulfonic acid salts, monobutylbiphenylsulfonic acid salts, and dibutylphenylphenoldisulfonic acid salts.

Examples of the nonionic surfactants include polyoxyethylene alkyl ethers, polyoxyethylene alkylphenyl ethers, polyoxyethylene fatty acid esters, sorbitan fatty acid esters, polyoxyethylene-sorbitan fatty acid esters, polyoxyethylene-sorbitol fatty acid esters, glycerin fatty acid esters, polyoxyethylene-glycerin fatty acid esters, polyglycerin fatty acid esters, sucrose fatty acid esters, polyoxyethylene alkylamines, polyoxyethylene fatty acid amides, alkylalkanolamides, polyethylene glycol/polypropylene glycol block copolymers, and acetylene glycol.

Preferred of these nonionic surfactants are polyoxyethylene nonylphenyl ether, polyoxyethylene octylphenyl ether, polyoxyethylene dodecylphenyl ether, polyoxyethylene alkyl ethers, polyoxyethylene fatty acid esters, sorbitan fatty acid esters, polyoxyethylene-sorbitan fatty acid esters, fatty acid alkylolamides, polyethylene glycol/polypropylene glycol block copolymers, and acetylene glycol.

Other examples of the nonionic surfactant include: silicone surfactants such as polysiloxane oxyethylene adducts; fluorochemical surtfactants such as perfluoroalkylcarboxylic acid salts, perfluoroalkylsulfonic acid salts, and oxyethylene perfluoroalkyl ethers; and biosurfactants such as spiculisporic acid, rhamnolipid, and lysolecithin.

It is desirable that such other surfactants should have a hydrophile-lipophile balance (HLB) in the range of, for example, from 3 to 20, when the solubility thereof, etc. are taken into account.

Such other surfactant may be used either alone or in combination of two or more thereof.

The content of such other surfactant is preferably from 0.1% by mass to 10% by mass, more preferably from 0.1% by mass to 5% by mass, even more preferably from 0.2% by mass to 3% by mass, based on the specific ink.

(Other Additive)

Other additive is explained.

The specific ink may contain other additive.

Examples of the other additive include ink ejection improvers (e.g., polyethyleneimine, polyamines, polyvinylpyrrolidone, polyethylene glycol, ethyl cellulose, and carboxymethyl cellulose), conductivity/pH regulators (e.g., compounds of alkali metals, such as potassium hydroxide, sodium hydroxide, and lithium hydroxide), reactive diluent solvents, penetrants, pH buffers, antioxidants, fungicides, viscosity modifiers, conductive agents, chelating agents, ultraviolet absorbers, and infrared absorbers.

(Properties of the Specific Ink)

Suitable properties of the specific ink are explained.

The pH of the specific ink may be preferably in the range of from 4 to 10, more preferably in the range of from 5 to 9.

The pH values of the specific ink employed here are values measured with a pH/conductivity meter (MPC 227, manufactured by Mettler Toledo Inc.) in an atmosphere having a temperature of 23±0.5° C. and a humidity of 55±5% R.H.

The electrical conductivity of the specific ink may be, for example, in the range of from 0.01 S/m to 0.5 S/m (preferably in the range of from 0.01 S/m to 0.25 S/m, more preferably in the range of from 0.01 S/m to 0.20 S/m).

Electrical conductivity is measured with MPC 227 (pH/conductivity meter, manufactured by Mettler Toledo Inc.).

The viscosity of the specific ink may be, for example, in the range of from 1.5 mPa·s to 30 mPa·s (preferably in the range of from 1.5 mPa·s to 20 mPa·s).

Viscosity is measured using TV-20 (manufactured by Toki Sangyo Co., Ltd.) as a measuring device under the conditions of a measuring temperature of 23° C. and a shear rate of 1,400 $s^{-1}$.

The specific ink may be any of, for example, a black ink, cyan ink, magenta ink, yellow ink, and inks of intermediate colors other than these colors.

The specific ink may be used as an ink set in which at least one of the inks is the specific ink (preferably, each of all the inks is the specific ink).

[Impermeable Medium]

The impermeable medium to be used in the exemplary embodiment is explained next.

The impermeable medium is an impermeable recording medium which has, on at least one surface thereof, an undercoat layer including a polymeric compound (hereinafter often referred to as specific polymeric compound) selected from the group consisting of polyurethanes, polyesters, polyvinyl chloride, and polyolefins.

(Impermeable Recording Medium)

Examples of the impermeable recording medium on which an undercoat layer is to be formed include plastic films and coated paper. Specifically, the term impermeable recording medium means a recording medium in which, in an examination with a dynamic scanning liquid absorption meter, the maximum specific-ink absorption in a contact time of 500 ms is 15 $mL/m^2$ or less.

Specific examples of the impermeable recording medium include a plastic film such as PET (polyethylene terephthalate) film, PVC (polyvinyl chloride) film, polypropylene film, polyethylene film, and nylon film. These plastic films may be ones which have undergone a surface treatment such as a corona treatment, UV/ozone treatment, or plasma treatment.

As these plastic films, a commercial product may be used.

Examples of the coated paper include "OK Topcoat+", manufactured by Oji Paper Co., Ltd.

In the case of coated paper, an undercoat layer including the specific polymeric compound is formed on the coated surface thereof to give the impermeable medium.

(Undercoat Layer)

The undercoat layer in the impermeable medium includes a polymeric compound selected from the group consisting of polyurethane, polyester, polyvinyl chloride, and polyolefin. Polyurethane is preferred of these specific polymeric compounds from the standpoint of fixability.

Each of these polymeric compounds is explained below.

The polyurethane as one kind of specific polymeric compound may be any polymer which has an urethane bond (—NHC(═O)O—) in the main chain.

The polyester as another kind of specific polymeric compound may be any polymer which has an ester bond (—CO—O—) in the main chain.

The polyvinyl chloride as another kind of specific polymeric compound may be any polymer in which at least 30% by number of all the constituent units that constitute the polymer are constituent units derived from vinyl chloride.

The polyolefins as another kind of specific polymeric compound may be any polymer in which at least 30% by number of all the constituent units that constitute the polymer are constituent units derived from one or more olefins (preferably, one or more α-olefins).

From the standpoints of film-forming property and viscosity, the molecular weights of such specific polymeric compounds are, for example, preferably from 5,000 to 100,000, more preferably from 5,000 to 50,000, in terms of weight-average molecular weight.

In the exemplary embodiment, the weight-average molecular weight and number-average molecular weight of a polymeric compound are determined by gel permeation chromatography (GPC). In the determination of the molecular weights by GPC, measurements are made using GPC HLC-8120 GPC, manufactured by Tosoh Corp., as a measuring apparatus and column TSKgel SuperHM-M (15 cm), manufactured by Tosoh Corp., and using a THF solvent. The weight-average molecular weight and the number-average molecular weight are calculated from the results of the measurements using molecular-weight calibration curves drawn with monodisperse standard polystyrene samples.

From the standpoint of improving adhesiveness to the specific ink, the content of the specific polymeric compound is preferably from 30% by mass or more, more preferably from 50% by mass to 100% by mass, even more preferably from 80% by mass to 95% by mass, based on the undercoat layer.

—Silicone Surfactant and Fluorochemical Surfactant—

It is preferable that the undercoat layer in the impermeable medium contains a surfactant selected from the group consisting of a silicone surfactant and a fluorochemical surfactant.

The inclusion of such a surfactant enables the surface of the undercoat layer to have a reduced coefficient of friction and makes it possible to form images having improved abrasion resistance thereon.

As a fluorochemical surfactant, a known fluorochemical surfactant is used.

As a silicone surfactant, a known silicone surfactant is used. For example, the polyether-modified silicone for use in the specific ink may be used.

From the standpoint of improving the abrasion resistance of recorded images, the content of the surfactant is preferably from 1% by mass to 50% by mass, more preferably from 1% by mass to 30% by mass, based on the undercoat layer.

—Cationic Polymer or Cationic Compound—

It is preferable that the undercoat layer in the impermeable medium further contains a cationic compound or contains a cationic polymeric compound as the specific polymeric compound.

The inclusion of a cationic compound in the undercoat layer causes an aggregation reaction between the undercoat layer and the specific ink which is anionic, thereby inhibiting image blurring and hence resulting in an improvement in image quality.

In the latter case, the term cationic polymeric compound means a polymeric compound (specific polymeric compound) which is selected from the group consisting of the polyurethanes, polyesters, polyvinyl chloride, and polyolefins shown above and into which a cationic functional group is introduced.

Examples of the cationic functional group include a group derived from an amine salt (primary, secondary, and tertiary), an onium salt (quaternary ammonium salt and phosphonium salt), and a heteroaromatic ring having a nitrogen atom.

In the case where the undercoat layer contains a cationic polymeric compound as a specific polymeric compound, the content of the cationic polymeric compound may be set in accordance with the desired content of cationic functional groups in the undercoat layer while taking account of the amount of the cationic functional groups present in the cationic polymeric compound. The undercoat layer may include one or more specific polymeric compounds, all of which may be cationic polymeric compounds or some of which may be cationic polymeric compounds.

Furthermore, the undercoat layer may further contain a cationic compound as a component other than the specific polymeric compound, as stated above.

By thus incorporating a cationic compound as a component other than the specific polymeric compound, the content of cationic functional groups in the undercoat layer can be easily regulated and the molecular design of the specific polymeric compound is prevented from becoming complicated.

Examples of the cationic compound to be used here include a low-molecular-weight compound having a cationic functional group, other than a polymeric compound which is not the specific polymeric compound and into which a cationic functional group is introduced.

Preferred examples of the low-molecular-weight compound having a cationic functional group include a cationic surfactant having a cationic functional group and having the ability to enhance surface activity.

Examples of the cationic surfactant include known surfactants such as amine salts, quaternary ammonium salts, pyridinium salts, and imidazolinium salts.

The content of the cationic compound may be set in accordance with the content of cationic functional group in the undercoat layer described above. However, in the case of a low-molecular-weight compound having a functional group (cationic surfactant), the content thereof is desirably in the range of, for example, from 0.1% by mass to 10% by mass (preferably from 0.1% by mass to 5% by mass) based on the undercoat layer, from the standpoints of image quality and adhesiveness.

—Solvent—

For forming the undercoat layer, a coating fluid (application liquid) prepared by dissolving or dispersing the ingredient for undercoat layer formation may be used.

Water is suitable for use as the solvent.

—Other Additive—

The undercoat layer in the impermeable medium may contain other additive.

Examples of the other additive include a surfactant other than the silicone surfactant, the fluorochemical surfactant, and the cationic surfactant shown above.

Surfactants including the silicone surfactant, the fluorochemical surfactant, and the cationic surfactant shown above, when incorporated into the coating fluid for use in forming the undercoat layer, enable the coating fluid to show satisfactory wetting properties and improved film-forming properties when applied to an impermeable recording medium. As a result, the undercoat layer can be inhibited from being formed unevenly even on impermeable recording media.

For forming the undercoat layer, a method in which the coating fluid for undercoat layer formation is applied to an impermeable recording medium using a coating technique, e.g., roller coating, and drying the coating fluid applied can be used.

The drying temperature is preferably from 40° C. to 120° C., more preferably from 40° C. to 100° C. The drying period is preferably from 0.01 minute to 10 minutes, more preferably from 0.01 minute to 1 minute.

The thickness of the undercoat layer in the impermeable medium is preferably in the range of from 0.01 μm to 20 μm, more preferably in the range of from 0.01 μm to 10 μm, from the standpoint of image quality.

The exemplary embodiment described above should not be construed as being limited to the embodiment only. It is a matter of course that the invention can be practiced within such a range that the requirements according to the invention are satisfied.

EXAMPLES

The invention will be explained below in more detail by reference to Examples, but the invention should not be construed as being limited to the following Examples in any way.

[Preparation of Inks]

- Carbon black (Mogul L, manufactured by Cabot Corp.) (coloring agent): 5% by mass
- Styrene/acrylic acid copolymer neutralized with sodium: 2.5% by mass (water-soluble resin; weight-average molecular weight=30,000)
- TOCRYL W-4627 (manufactured by Toyo Chem Co., Ltd.): 5% by mass (solid amount)

(acrylic emulsion; polymer particles; volume-average particle diameter=0.12 μm; glass transition temperature=45° C.)

- Glycerin: 10% by mass
- Surfactant (compounds shown in Table 1): the amount in % by mass shown in Table 1
- Ion-exchanged water: remainder (the amount which results in an overall ink amount of 100% by mass)

The ingredients shown above are mixed together, and the resultant mixture is filtered with a 5-μm filter. Thus, inks 1 and 2, which are specific inks, and inks 3 and 4, which are comparative inks, are obtained.

(Determination of Properties)

The inks obtained above are examined for static surface tension, dynamic surface tension at 1 msec after and at 1 sec after, and the width of variation in dynamic surface tension by the methods described above.

The results thereof are shown in Table 1.

TABLE 1

| | Surfactant | | | | Static surface tension (mN/m) | Dynamic surface tension (mN/m) | | |
|---|---|---|---|---|---|---|---|---|
| | Kind | Amount (mass %) | Kind | Amount (mass %) | | 1 msec | 1 sec | Width of variation |
| Ink 1 | Silface SAG503A | 0.1 | — | — | 22 | 27.7 | 26.1 | 1.6 |
| Ink 2 | Olfin E1010 | 1.0 | Olfin EXP.4123 | 2.0 | 27 | 29.0 | 28.8 | 0.2 |
| Ink 3 | Olfin E1010 | 1.0 | — | — | 34 | 38.2 | 33.5 | 4.9 |
| Ink 4 | Olfin E4300 | 1.0 | — | — | 31 | 36.0 | 29.8 | 6.2 |

The abbreviations and other details of the surfactants shown in Table 1 are as follows.

—Ethylene Oxide Adducts of Acetylene Glycol (Manufactured by Nisshin Chemical Industry Co., Ltd.)—

Olfin E1010 (HLB=13 to 14)

Olfin EXP.4123 (HLB=11 to 14)

—Polyether-Modified Silicone (Manufactured by Nisshin Chemical Industry Co., Ltd.)—

Silface SAG503A (HLB=11)

[Production of Recording Media]

(Production of Recording Media A1 to A3 )

A coating fluid A for undercoat layer formation shown below is applied with a bar coater to one surface of each of three impermeable recording media, i.e., a PET film (Lumirror T60 (which has not undergone corona treatment), manufactured by Toray), another PET film (Lumirror S105 (which has undergone corona treatment), manufactured by Toray), and a PVC film (Sumilite, manufactured by Sumitomo Bakelite), so as to result in a dry thickness of 5 μm.

The coating fluid applied is dried at 80° C. for 3 minutes.

The recording medium obtained using Lumirror T60 is referred to as recording medium A1, that obtained using Lumirror S105 is referred to as recording medium A2, and that obtained using Sumilite is referred to as recording medium A3.

—Coating Fluid A for Undercoat Layer Formation—

Polyurethane (NS313X, manufactured by Takamatsu Yushi): 10% by mass

Surfactant (Olefin E1010, manufactured by Nisshin Chemical Industry Co., Ltd.): 1% by mass Pure water remainder (the amount resulting in an overall coating fluid amount of 100% by mass)

(Production of Recording Media B1 to B3)

Recording media B1 to B3 are produced in the same manner as for recording media A1 to A3, except that the coating fluid B for undercoat layer formation shown below is used in place of the coating fluid A for undercoat layer formation.

—Coating Fluid B for Undercoat Layer Formation—

Polyester (Plas Coat Z446, manufactured by Goo Chemical Co., Ltd.): 10% by mass

Silicone surfactant: 1% by mass (Silface SAG503A, manufactured by Nisshin Chemical Industry Co., Ltd.)

Pure water: remainder (the amount resulting in an overall coating fluid amount of 100% by mass)

(Production of Recording Media C1 to C3)

Recording media C1 to C3 are produced in the same manner as for recording media A1 to A3, except that the coating fluid C for undercoat layer formation shown below is used in place of the coating fluid A for undercoat layer formation.

—Coating Fluid C for Undercoat Layer Formation—

Cationic polyurethane (Super Flex 650, manufactured by Dai-ichi Kogyo Seiyaku): 10% by mass Silicone surfactant: 1% by mass (Silface SAG503A, manufactured by Nisshin Chemical Industry Co., Ltd.)

Pure water: remainder (the amount resulting in an overall coating fluid amount of 100% by mass)

(Production of Recording Media D1 to D3 )

Recording media D1 to D3 are produced in the same manner as for recording media A1 to A3, except that the coating fluid D for undercoat layer formation shown below is used in place of the coating fluid A for undercoat layer formation.

—Coating Fluid D for Undercoat Layer Formation—

Polyvinyl chloride (Vinyblan 701RL50, manufactured by Nissin Chemical Industry Co., Ltd.): 10% by mass Silicone surfactant: 1% by mass (Silface SAG503A, manufactured by Nisshin Chemical industry Co., Ltd.)

Pure water: remainder (the amount resulting in an overall coating fluid amount of 100% by mass)

(Production of Recording Media E1 to E3)

Recording media E1 to E3 are produced in the same manner as for recording media A1 to A3, except that the coating fluid E for undercoat layer formation shown below is used in place of the coating fluid A for undercoat layer formation.

—Coating Fluid E for Undercoat Layer Formation—

Polyolefin (Hardlen, manufactured by Toyobo): 10% by mass

Silicone surfactant: 1% by mass (Silface SAG503A, manufactured by Nisshin Chemical Industry Co., Ltd.)

Pure water: remainder (the amount resulting in an overall coating fluid amount of 100% by mass)

(Production of Recording Media F1 to F3)

Recording media F1 to F3 are produced in the same manner as for recording media A1 to A3, except that the coating fluid F for undercoat layer formation shown below is used in place of the coating fluid A for undercoat layer formation.

—Coating Fluid F for Undercoat Layer Formation—

Polyurethane (NS313X, manufactured by Takamatsu Yushi): 10% by mass

Silicone surfactant: 1% by mass (Silface SAG503A, manufactured by Nisshin Chemical Industry Co., Ltd.)

Cationic surfactant (Catiogen TML, manufactured by Dai-ichi Kogyo Seiyaku): 0.5% by mass Pure water: remainder (the amount resulting in an overall coating fluid amount of 100% by mass)

(Recording Media G1 to G3)

Recording media G1 to G3 are produced in the same manner as for recording media A1 to A3, except that the coating fluid G for undercoat layer formation shown below is used in place of the coating fluid A for undercoat layer formation.

—Coating Fluid G for Undercoat Layer Formation—

Poly(vinyl alcohol) (Kuraray Poval PVA105, manufactured by Kuraray): 10% by mass Silicone surfactant: 1% by mass (Silface SAG503A, manufactured by Nisshin Chemical Industry Co., Ltd.)

Pure water: remainder (the amount resulting in an overall coating fluid amount of 100% by mass)

(Recording Media H1 to H3)

A PET film (Lumirror T60 (which has not undergone corona treatment), manufactured by Toray), another PET film (Lumirror S105 (which has undergone corona treatment), manufactured by Toray), and a PVC film (Sumilite, manufactured by Sumitomo Bakelite), are used as such, without forming an undercoat layer, as recovering medium H1, recording medium H2, and recording medium H3, respectively.

[Examples 1 to 7 and Comparative Examples 1 to 6 ]

Preparation of Recording Apparatus

A recording apparatus having the same configuration as that shown in FIGURE and equipped with a 600-dpi piezoelectric head (amount of largest ink droplet, 11 pL) as an ink ejection head is prepared.

As recording media P for this recording apparatus, the recording media described above are used.

Details of the recording apparatus are as follows.

—Details of Recording Apparatus—

Recording speed (recording medium conveying speed): 25 m/min

Set temperature of drying drum: 100° C.

Set temperature of hot-air blower: 100° C.

The inks described above each are packed into the recording apparatus.

This recording apparatus is used to conduct the following image recording.

(Image Recording)

Using each recording apparatus, the ink is ejected from the 600-dpi piezoelectric head (amount of largest ink droplet, 11 pL) to the surface of each recording medium to record thereon solid images of 1.5 cm×1.5 cm and an image configured of characters and rules. Thereafter, this recording medium is dried with the drying drum and the hot-air blower and cooled with the cooling rollers. Through these steps, images formed from the ink are recorded on the recording medium P (with thermal drying).

(Evaluation of Abrasion Resistance)

The recorded images are evaluated for abrasion resistance in the following manner.

Namely, the images conveyed out after the image recording and drying are visually examined to evaluate image peeling.

The criteria for the evaluation are as follows. The results of the evaluation are shown in Table 2 below.

—Criteria for Abrasion Resistance Evaluation—

A+: no peeling is observed in the images

A: peeling is observed in a slight portion of the images

B: peeling is observed in part of the images

C: the images have suffered considerable peeling and are disordered (Evaluation of Blurring)

The recorded images are visually examined to evaluate image blurring.

The criteria for the evaluation are as follows. The results of the evaluation are shown in Table 2.

—Criteria for Image Blurring—

A+: the images have no blurring

A: the images have slight blurring

B: the images have many blurred portions

C: image blurring is serious

TABLE 2

| | | | Evaluation | |
|---|---|---|---|---|
| | Kind of Ink | Kind of recording medium | Abrasion resistance | Blurring |
| Example 1 | ink 1 | recording medium A1 | A | A |
| | | recording medium A2 | A | A |
| | | recording medium A3 | A | A |
| Example 2 | ink 1 | recording medium B1 | A | A |
| | | recording medium B2 | A+ | A |
| | | recording medium B3 | A | A |
| Example 3 | ink 1 | recording medium C1 | A | A+ |
| | | recording medium C2 | A+ | A+ |
| | | recording medium C3 | A | A+ |
| Example 4 | ink 1 | recording medium D1 | A | A |
| | | recording medium D2 | A | A |
| | | recording medium D3 | A | A |
| Example 5 | ink 1 | recording medium E1 | A | A+ |
| | | recording medium E2 | A+ | A+ |
| | | recording medium E3 | A | A+ |
| Example 6 | ink 1 | recording medium F1 | A | A |
| | | recording medium F2 | A | A+ |
| | | recording medium F3 | A+ | A+ |
| Example 7 | ink 2 | recording medium A1 | A | A+ |
| | | recording medium A2 | A+ | A+ |
| | | recording medium A3 | A | A+ |
| Comparative Example 1 | ink 3 | recording medium A1 | C | C |
| | | recording medium A2 | B | C |
| | | recording medium A3 | B | C |
| Comparative Example 2 | ink 3 | recording medium B1 | C | C |
| | | recording medium B2 | B | C |
| | | recording medium B3 | B | C |
| Comparative Example 3 | ink 3 | recording medium C1 | C | A |
| | | recording medium C2 | C | A |
| | | recording medium C3 | C | A |
| Comparative Example 4 | ink 4 | recording medium A1 | C | B |
| | | recording medium A2 | C | B |
| | | recording medium A3 | C | B |
| Comparative Example 5 | ink 1 | recording medium G1 | C | B |
| | | recording medium G2 | C | B |
| | | recording medium G3 | C | B |

TABLE 2-continued

| | | | Evaluation | |
|---|---|---|---|---|
| | Kind of Ink | Kind of recording medium | Abrasion resistance | Blurring |
| Comparative Example 6 | ink 1 | recording medium H1 | C | B |
| | | recording medium H2 | C | B |
| | | recording medium H3 | C | B |

It can be seen from the results that in cases when images are recorded on the undercoat layers (containing the specific polymeric compound) of the impermeable recording media using the specific inks in the Examples, the images have excellent abrasion resistance and image blurring is inhibited, as compared with the case where the comparative inks are used (Comparative Examples 1 to 4), the case where an impermeable recording medium having an undercoat layer including poly(vinyl alcohol) is used (Comparative Example 5), or the case where an impermeable recording medium having no undercoat layer is used (Comparative Example 6).

What is claimed is:

1. A recording apparatus equipped with an ejection head that ejects an ink to a surface of the undercoat layer of an impermeable recording medium that has, on at least one surface thereof, an undercoat layer comprising a polymeric compound selected from the group consisting of polyurethane, polyester, polyvinyl chloride, and polyolefin, wherein the ink comprises a coloring agent, a polymer particle, water, and a water-soluble organic solvent and has a static surface tension of less than 30 mN/m and, when examined for dynamic surface tension by a maximum bubble pressure method, has a width of variation in dynamic surface tension of from 0.2 to 3.0 mN/m, the width of variation in dynamic surface tension being a difference between the dynamic surface tension measured at 1 msec after and the dynamic surface tension measured at 1 sec after a new interface was formed at the end of a capillary and when a maximum bubble pressure is reached.

2. The recording apparatus according to claim 1, wherein the undercoat layer in the impermeable recording medium further contains a surfactant selected from the group consisting of a silicone surfactant and a fluorochemical surfactant.

3. The recording apparatus according to claim 1, wherein the undercoat layer in the impermeable recording medium further contains a cationic compound or contains a cationic polymeric compound as the polymeric compound.

4. The recording apparatus according to claim 1, which is further equipped with a drying device that dries the ink ejected to the surface of the undercoat layer of the impermeable recording medium.

5. A recording method including an ejection step in which an ink that comprises a coloring agent, a polymer particle, water, and a water-soluble organic solvent and that has a static surface tension of less than 30 mN/m and, when examined for dynamic surface tension by a maximum bubble pressure method, has a width of variation in dynamic surface tension of from 0.2 to 3.0 mN/m, the width of variation in dynamic surface tension being a difference between the dynamic surface tension measured at 1 msec after and the dynamic surface tension measured at 1 sec after a new interface was formed at the end of a capillary and when a maximum bubble pressure is reached, is ejected to a surface of the undercoat layer of an impermeable recording medium that has, on at least one surface thereof, an undercoat layer comprising a polymeric compound selected from the group consisting of polyurethane, polyester, polyvinyl chloride, and polyolefin.

6. The recording method according to claim 5, wherein the undercoat layer in the impermeable recording medium further contains a surfactant selected from the group consisting of a silicone surfactant and a fluorochemical surfactant.

7. The recording method according to claim 5, wherein the undercoat layer in the impermeable recording medium further contains a cationic compound or contains a cationic polymeric compound as the polymeric compound.

8. The recording method according to claim 5, which further includes a drying step that dries the ink ejected to the surface of the undercoat layer of the impermeable recording medium.

* * * * *